United States Patent [19]
Zinnbauer et al.

[11] 3,850,763
[45] Nov. 26, 1974

[54] METHOD OF PRODUCING A VEHICLE BUMPER

[75] Inventors: Fredrick W. Zinnbauer, Dearborn; Jack C. Ferner, Detroit, both of Mich.

[73] Assignee: Reynolds Metals Company, Richmond, Va.

[22] Filed: Nov. 14, 1973

[21] Appl. No.: 415,766

[52] U.S. Cl.................. 204/33, 148/12.7, 204/58
[51] Int. Cl. ..................... C23b 9/02, C22d 1/04
[58] Field of Search ........ 148/11.5 A, 12.7; 204/29, 204/33, 58

[56] References Cited
UNITED STATES PATENTS

| | | | |
|---|---|---|---|
| 3,093,459 | 6/1963 | Siebel et al. .................. | 148/11.5 A |
| 3,180,806 | 4/1965 | Hollingsworth................ | 148/11.5 A |
| 3,212,941 | 10/1965 | O'Brien......................... | 148/11.5 A |
| 3,734,784 | 5/1973 | Bereday et al................. | 204/29 |

*Primary Examiner*—W. Stallard
*Attorney, Agent, or Firm*—Glenn, Palmer, Lyne & Gibbs

[57] ABSTRACT

A method of producing an automotive vehicle bumper from an extruded blank of a heat treatable, age hardenable aluminum alloy. The method comprises heating the blank to a solution heat treating temperature for the alloy, working the blank while hot to a preliminary contour, quenching the hot formed blank to a temperature at which the temper of the alloy is unstable, cold working the blank before any appreciable natural age hardening occurs and to a bumper contour in which the blank is dimensionally stable, and ageing the formed and shaped blank. The blank may be subjected to further finishing operations including trimming and hole punching prior to ageing, and buffing, chemically brightening and anodizing the aged blank to enhance the appearance of the outer surface of the final bumper product.

21 Claims, 9 Drawing Figures

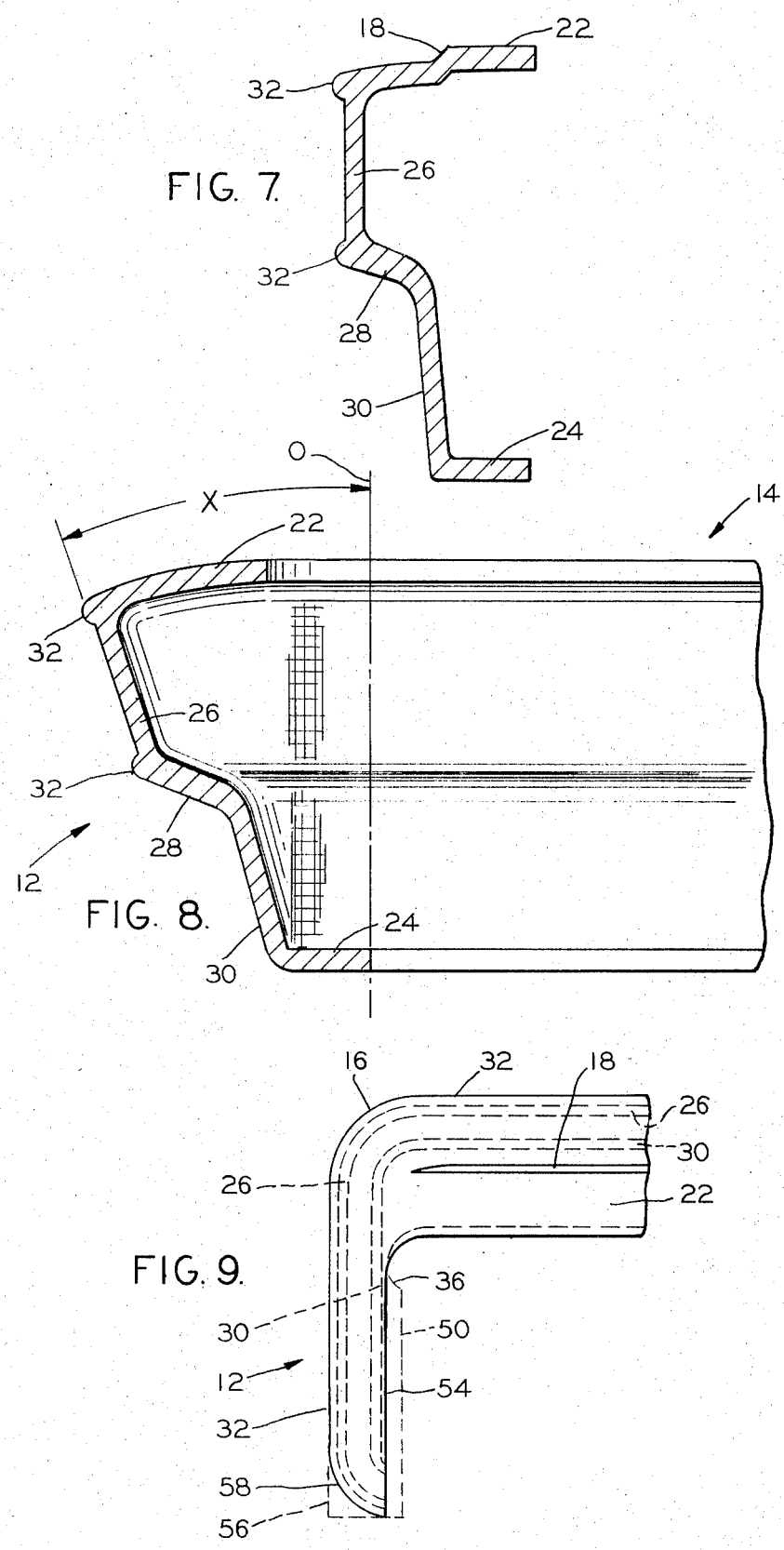

METHOD OF PRODUCING A VEHICLE BUMPER

This invention relates to the art of aluminum alloy bumpers for automotive vehicles such as automobiles and, more particularly, to the production of an automotive vehicle bumper from an extruded blank of heat treatable, age hardenable aluminum alloy.

BACKGROUND

It is of course well known that vehicle bumpers are most often produced by forming sheet steel of generally uniform thickness to a desired bumper shape by a series of press forming operations. Vehicle bumpers have also been produced by forming an extruded aluminum alloy blank to provide a desired bumper shape. In comparison with a steel bumper of comparable size in outer longitudinal and transverse profile, many advantages are attendant to an aluminum bumper and the manufacture thereof which are not realized or are not readily and/or economically attainable with respect to the steel bumper. In this respect, for example, the extrusion of a vehicle bumper blank increases the selectivity of desired cross-sectional bumper contour both with respect to design or profile configuration and thickness of material in various areas of the cross section where additional thickness is desired for impact and load capability of the bumper.

Advantages in profile configuration are achieved in that the extrusion enables the cross-sectional profile to include sharp corner edges and outer bumper face profiles which cannot be obtained by die forming sheet steel of relatively uniform thickness. Further, by providing areas of increased thickness in the cross section of the aluminum extrusion, an aluminum bumper can be produced to have increased impact and load capacities relative to a steel bumper of comparable size and, at the same time, the aluminum bumper is much lighter in weight. A reduction in bumper weight enhances handling thereof during manufacture and mounting operations, and reduces the load on the suspension system of a vehicle on which it is mounted. In view of the ever increasing addition of heavy accessory equipment such as air conditioning units to vehicles, such a reduction in load on the suspension system is highly desirable. Still further, aluminum alloy bumpers, anodized or otherwise protectively coated, do not corrode materially and do not lose their brightness, whereby a reduction in replacement and/or refinishing cost to the consumer is realized.

A most important consideration in the production of a vehicle bumper from an aluminum alloy extrusion is dimensional stability and conformity of the basic bumper product with respect to prescribed longitudinal and transverse linear and angular dimensions, and prescribed orientation of various portions of the bumper relative to corresponding reference axes or planes. Accordingly, it will be appreciated that the basic bumper product must accurately conform with a pattern specified by the vehicle manufacturer and which pattern, of course, conforms with the contour of the portion of the vehicle on which the bumper is mounted. For purposes of the ensuing description, the basic bumper product is an intermediate product in which all major metalworking operations affecting conformity of the bumper with the prescribed pattern have taken place, and only minor finishing operations and ageing are required to produce a final bumper product.

A vehicle bumper generally includes an intermediate portion adapted to extend, for example, across the front of a vehicle, and end portions extending from the intermediate portion a short distance along the corresponding side of the vehicle body. The dimensional stability and conformity referred to with respect to a basic bumper configuration may include, for example, the longitudinal dimension of the intermediate portion, the radius of curvature between the intermediate portion and each end portion, the parallel relationship of the end portions and intermediate portion with respect to a common horizontal reference plane, and the orientation of each end portion with respect to a corresponding vertical reference plane. It will be appreciated that other dimensions and dimensional relationships may require stability and conformance with a prescribed pattern, depending on the specific bumper design.

PRIOR ART

Heretofore, vehicle bumpers have been produced from a channel-shaped extruded blank of an aluminum alloy by hot forming the blank to a first bumper contour and then quick quenching the hot blank to provide a basic bumper product in which the dimensions and dimensional relationships between portions of the basic bumper are intended to conform with a prescribed pattern of the vehicle manufacturer. Thereafter, minor shaping operations are performed on the blank such as cupping of the terminal ends of the blank to produce a final bumper shape. The bumper is then artificially aged and may thereafter be chemically brightened and anodized to provide the final bumper product. This method of bumper production is disclosed in U.S. Pat. No. 3,212,941, issued Oct. 19, 1965 and assigned to the assignee of the present invention.

In producing an aluminum alloy vehicle bumper by the method disclosed in the aforementioned patent, difficulty is sometimes encountered with respect to achieving conformity of the basic bumper product with the prescribed pattern. In this respect, the blank is initially longitudinally straight, is heated to a heat treating temperature for the alloy, and is formed to the first bumper configuration in a press by bending end portions of the blank in the direction of the open side of the channel. Bending the hot blank is a major metalworking operation during which considerable stress is imposed on the components of the die assembly, whereby variations of the formed bumper from prescribed design parameters can occur at this point in the process.

The hot formed blank is then quenched as quickly as possible substantially to room temperature to provide the basic bumper product. Quenching the hot blank causes longitudinal shrinkage of the intermediate portion of the bumper between the end portions and to compensate for such shrinkage, the longitudinal dimension of the intermediate portion of the hot formed bumper is greater than the prescribed dimension. The bumper is intended, when quenched, to shrink so that the longitudinal dimension conforms with the prescribed dimension. It will be appreciated that the extent of shrinkage is variable from one bumper to the next, whereby the basic bumper product may or may not conform with the prescribed pattern with respect to this longitudinal dimension. Moreover, the affects of quenching may be cumulative with respect to the errors or variations resulting from hot forming, or may cause further variations in the bumper conrour from design parameters as a result of, for example, warping or twisting of the blank. The formed and quenched basic bumper is then trimmed, pierced and shaped to provide the final bumper contour. Any shaping which takes place at this point, however, does not affect dimensions or dimensional relationships in the areas of the basic bumper product, wherein dimensional conformity with the prescribed pattern is required.

It will be appreciated with respect to the foregoing method that any variances in the basic bumper product from design parameters which are critical to acceptance of the bumper become locked-in following the quenching operation. Such variations, while they may appear to the naked eye to be of a minor nature, are extremely important with regard to acceptability of the bumper, both with respect to mating thereof in the prescribed manner with the contours of the portions of the vehicle which the bumper overlies, and with respect to the decorative appearance thereof in conjunction with the lines of the vehicle. A single bumper unit is a costly item to have to scrap as a result of the failure thereof to conform with the prescribed dimensional and relative dimensional requirements.

THE INVENTION

In accordance with the present invention, an aluminum alloy bumper is produced in a manner which minimizes the possibility of the occurrence of dimensional variations of the foregoing character from prescribed dimensional parameters, whereby the accuracy of conformity of the basic bumper with a prescribed pattern is advantageously increased. Accordingly, the percentage of rejected bumper units is decreased whereby a savings in production cost is realized.

More particularly in accordance with the present invention, an extruded bumper blank of a heat treatable, age hardenable aluminum alloy is first hot worked to form a preliminary bumper configuration or contour. The preliminary contour approaches the desired basic contour which is prescribed for the bumper and in which the dimensions must be stable with respect to the prescribed parameters. The hot formed blank is then quenched to a temperature at which the temper of the alloy is unstable. While the temper of the alloy is unstable, the blank is cold worked from the preliminary contour to the basic contour in which the dimensions and dimensional relationships between portions of the blank conform to the prescribed parameters. By performing major cold working operations following quenching and while the temper of the alloy is unstable, any variations from design parameters resulting from the hot working operation and/or the quenching operation are advantageously eliminated, thus increasing the assurance that the resulting basic bumper product conforms dimensionally to the prescribed pattern for the bumper. Moreover, cold working the blank following hot forming and quenching advantageously improves the strength characteristics of the alloy.

It is to be emphasized at this point that the major cold working operation or operations performed on the blank are distinct from any minor shaping operations performed merely to relatively bend adjacent portions of the blank to enhance the appearance of the contour thereof. In this respect, the major cold working operations are performed to achieve desired dimensional and relative dimensional relationships between portions of the bumper blank and/or to correct undesirable relationships resulting from the hot working and quenching operations. Minor shaping operations which do not affect the prescribed basic dimensional requirements are also performed on the basic bumper product in accordance with the present invention and may include, for example, inward cupping of the terminal ends of the bumper blank.

The formed and shaped bumper blank is then artificially aged to produce a desired temper and, preferably, additional finishing operations are performed such as polishing and/or buffing, chemically brightening, and anodizing to enhance the appearance of the outer surface of the finished bumper.

The number and nature of the cold working operations which take place following hot working and quenching of the bumper blank will of course vary depending on the design of the bumper being produced. For example, the radius of the bend between the intermediate portion of the bumper and the wrap arounds or end portions thereof may be changed from a preliminary radius to a final radius conforming to the prescribed pattern and, at the same time, the longitudinal dimension of the intermediate portion of the bumper between the end portions becomes dimensionally stabilized by the cold working operation. Similarly, the cold working operation will eliminate any warping or twisting of the preliminarily formed blank resulting from the hot working and/or quenching operations. Other possible cold working operations include, but are not limited to, the intentional twisting of the end portions of the blank relative to a reference plane, and reshaping of the cross-sectional contour of the blank in an area or areas thereof between the terminal ends of the blank. All such major cold working operations are of a nature which have to be performed on the blank while the temper of the alloy is unstable so that the yield strength of the alloy is not so great as to inhibit the plastic deformation of the metal which must take place. Following the cold working operation or operations the basic blank contour resulting therefrom accurately conforms to prescribed dimensional and relative dimensional requirements for mating with the vehicle for which the bumper is intended, and the subsequent steps of production including minor shaping operations and ageing do not affect the dimensional stability which exists following the cold working operation.

OBJECTS

An outstanding object of the present invention is the provision of an improved method of producing a vehicle bumper from a heat treatable, age hardenable aluminum alloy blank.

Another object is the provision of a method for producing a bumper of the foregoing character and by which dimensional variation of the bumper product with respect to prescribed design parameters is minimized.

A further object is the provision of a method for producing a bumper of the foregoing character and by which desired dimensions and dimensional relationships of the bumper with respect to prescribed design paramters are both achieved and stabilized during the manufacturing process.

Yet another object is the provision of a method for producing a bumper of the foregoing character and by which the bumper blank is hot worked to a preliminary bumper contour, quenched to a temperature at which the temper of the alloy is unstable, and then cold worked while the temper of the alloy is unstable to a basic contour conforming with the prescribed design parameters, and during which cold working the prescribed dimensions of the basic bumper are stabilized.

Still another object is the provision of a method for producing a bumper of the foregoing character and by which the hot and cold worked bumper is subjected to minor shaping and finishing operations which do not affect the dimensional stability of the basic bumper.

PREFERRED EMBODIMENTS

The foregoing objects, and others, will in part be obvious and in part pointed out more fully hereinafter in conjunction with the written description relating to the accompanying drawings in which:

FIG. 7 is a sectional elevation view of the bumper blank illustrated in FIG. 6, the section being along line 7—7 of FIG. 6;

FIG. 8 is a sectional view of the bumper blank illustrated in FIG. 6, the section being along line 8—8 in FIG. 6; and, FIG. 9 is a detail plan view of one end of the bumper blank illustrating the final shape of the terminal end of the blank.

The showings in the accompanying drawings are merely for the purpose of illustrating one possible bumper configuration and bumper blank, and the manner in which the bumper is formed from the blank in accordance with the present invention. While a specific bumper configuration is shown as being produced from a blank having a particular channel-shaped cross-sectional contour, and while the method of the invention will be described in detail in conjunction therewith, it will be distinctly understood that the invention is applicable to the production of bumpers having other longitudinal configurations and from a blank having a cross-sectional contour other than that illustrated and other than that of an open channel.

Figure 1:
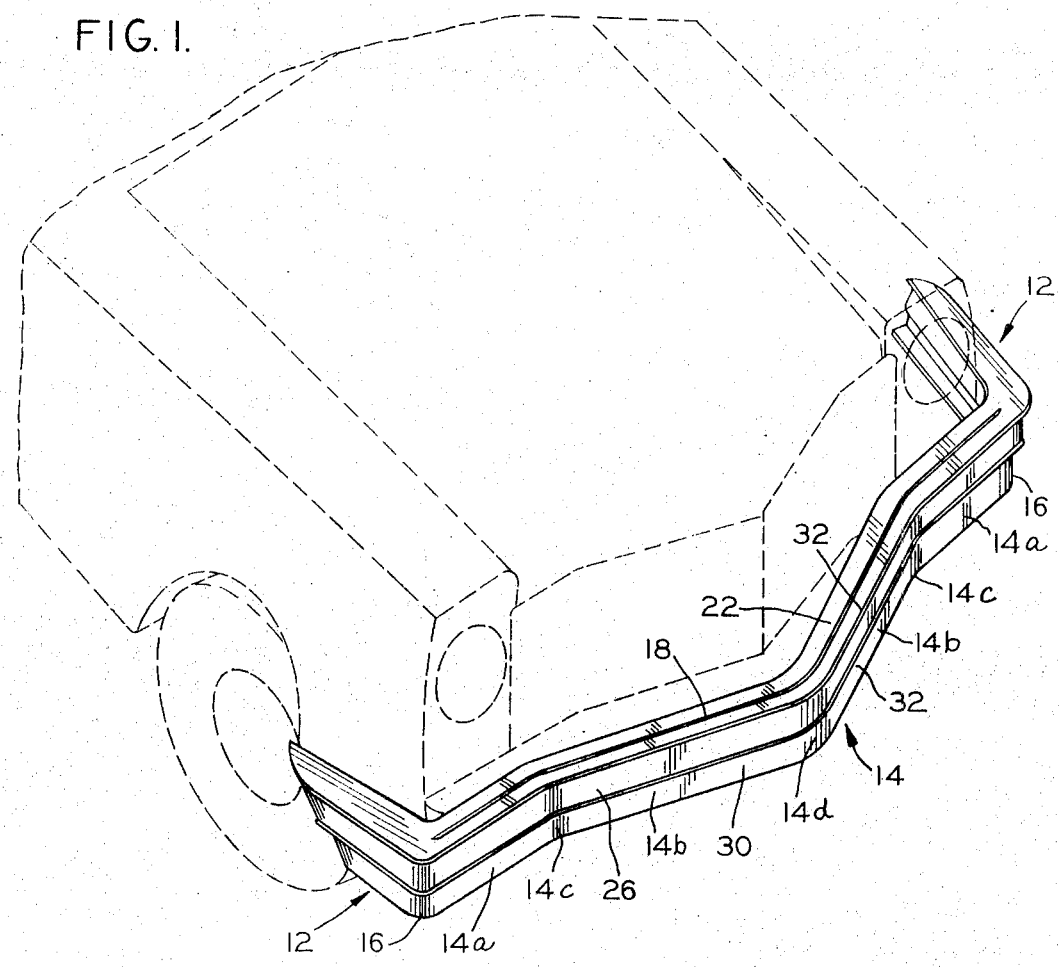
FIG. 1 is a perspective view of the mounted relationship between a finished bumper and a vehicle.

The finished bumper product to be produced in the manner described in detail hereinafter is illustrated in FIG. 1. To facilitate the description and a clear understanding of the method of production, the bumper is illustrated in FIG. 1 in association with the front end of a vehicle which is represented by broken lines. It will be seen in FIG. 1 that the bumper 10 is channel-shaped in cross section and includes end portions 12 angularly related with respect to intermediate portion 14. End portions 12 extend from intermediate portion 14 in the direction of the open side of the channel. Intermediate portion 14 extends across the front end of the vehicle and end portions 12 extend along corresponding sides of the vehicle. Each of the end portions 12 and the corresponding end of intermediate portion 14 provide a bumper corner 16 having a given radius of curvature. Further, in the embodiment illustrated intermediate portion 14 has portions 14a and 14b extending from each bumper corner 16 and bent relative to one another at 14c. Portions 14b are bent relative to one another to provide a ridge 14d generally centrally between corners 16. Each of the bends 14c and ridge 14d also have given radii of curvature.

The bumper contour must dimensionally conform to a prescribed pattern in order to assure that the bumper will mate with the contour of the front and side surfaces of the vehicle which the corresponding portions of the bumper overlie. The bumper contour must also conform dimensionally with the prescribed pattern to assure proper orientation of the bumper relative to the vehicle when mounted thereon and proper orientation of the various portions of the bumper relative to one another, as set forth more fully hereinafter. If the dimensional requirements are not met, the bumper contour may vary from the prescribed pattern to an extent that the bumper is unacceptable for its intended use.

In the bumper illustrated in FIG. 1, the areas of dimensional criticality include the radii of curvature of corners 16, bends 14c and ridge 14d and the angular relationship between adjacent ones of ends 12 and portions 14a and 14b. In this respect, these portions of the bumper must follow accurately as possible the corresponding contour of the front of the vehicle. Otherwise, there is an obvious detraction from the intended decorative appearance when the bumper is mounted on the vehicle. Moreover, any variance in the relative contours of the front of the vehicle and the bumper in these areas cannot be compensated for by trimming the top flange of the bumper in that this would provide an obvious detraction from the desired uniformity in appearance of the bumper per se. Another area of dimensional criticality lies in the distance between bumper corners 16. In this respect, if the spacing between corners 16 does not conform with the prescribed pattern, end portions 12 of the bumper will not have the desired spaced relationship with respect to the corresponding sides of the vehicle when the bumper is mounted thereon.

Another area of dimensional criticality in the specific bumper embodiment illustrated in FIG. 1 lies in the orientation of end portions 12 relative to a corresponding vertical reference plane. More particularly, the portions of the sides of the vehicle which bumper portions 12 overlie are inclined downwardly and inwardly with respect to vertical. Accordingly, end portions 12 must be twisted relative to the corresponding corner 16 for the end portions of the bumper from the top edge to the bottom edge thereof to extend downwardly and inwardly relative to a vertical reference plane. It will be appreciated that this twisting of the end portions must be achieved without affecting the radius of curvature at corners 16. Yet a further area of dimensional criticality involves the orientation of end portions 12 relative to a common reference plane, and the orientation of the latter reference plane relative to intermediate portion 14 of the bumper. In this respect, end portions 12 must be parallel to one another in a manner whereby the top flanges thereof, for example, are coplanar and, in the embodiment illustrated, the latter flanges must be coplanar with respect to the top flange of intermediate portion 14 of the bumper.

In the bumper embodiment illustrated in FIG. 1, a further area of dimensional criticality involves the provision of the top flange of intermediate portion 14 of the bumper with an eyebrow or stepped configuration 18 extending longitudinally thereof between bumper corners 16. Dimensional criticality is involved in this area in that the eyebrow must be provided without distorting the desired relationship between the portions of the top flange of the bumper on opposite sides of the eyebrow and without affecting the radii of curvature of corners 16, bends 14c and ridge 14d of the bumper.

It will be appreciated from the foregoing description of the bumper configuration illustrated in FIG. 1, that the areas of dimensional criticality with regard to the bumper contour relate to the basic bumper configuration relative to the contour of the portions of the vehicle which the bumper overlies when mounted thereon. Accordingly, once the basic bumper configuration has been formed, subsequent shaping of portions of the bumper can be achieved to provide the final overall bumper contour. Such subsequent shaping operations do not involve areas of dimensional criticality and do not affect the dimensions and dimensional relationships between the various portions of the bumper established by forming the basic bumper product. Such subsequent shaping operations may include, for example, inward cutting of the terminal ends of end portions 12.

Figure 2:
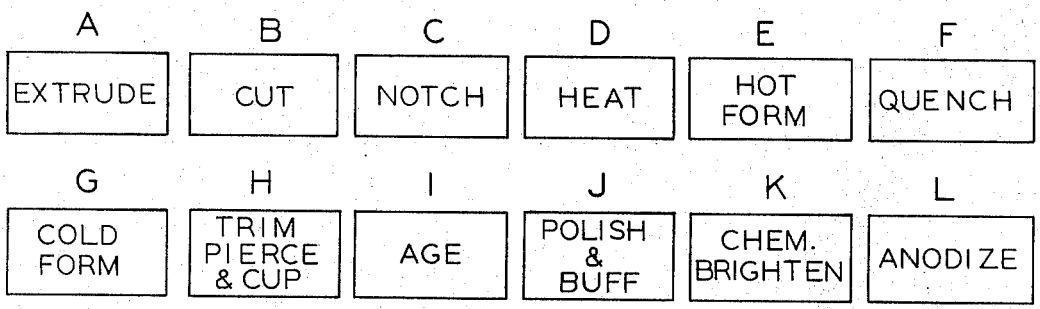
FIG. 2 is a block diagram representing a sequence of steps for producing a bumper in accordance with the present invention.

FIG. 2 illustrates in block diagram form a preferred sequence of steps for producing the specific bumper described above in accordance with the present invention. In this respect, billets of the aluminum alloy from which the bumper is to be formed are extruded at A to form a continuous strip of desired cross-sectional shape for the bumper, which shape in the embodiment illustrated is in the form of an open channel having the cross-sectional configuration illustrated in FIG. 3. The extruded strip is cut at B to form bumper blanks 20, each of which is of a suitable length for forming the bumper product.

Bumper blank 20 includes a top flange 22, a bottom flange 24 and a web portion between the flanges. The web portion includes an upper web portion 26 depending from the front edge of flange 22, an in-turned web portion 28 inclining inwardly and downwardly from the lower edge of portion 26, and a lower web portion 30 extending between the inner edge of portion 28 and the front edge of flange 24. Further, upper portion 26 of the web is bounded along its upper and lower edges by beads 32 which project forwardly from the outer surface of upper portion 26 of the web.

Figure 4:
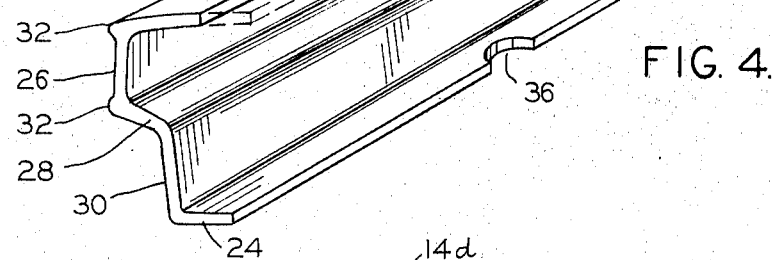
FIG. 4 is a perspective view of one end of the blank illustrated in FIG. 3 and showing the notching thereof.

Preferably, flanges 22 and 24 of blank 20 are notched adjacent the opposite ends of the blank to facilitate bending of the end portions of the blank relative to the intermediate portion thereof. One end of blank 20 is illustrated in FIG. 4, and it will be seen that the rear edge of flange 22 is notched at 34 and that the rear edge of flange 24 is notched at 36. Notches 34 and 36 generally overlie one another, and the portions of flanges 22 and 24 between the notches and the front edge of the corresponding flange define an imaginary area dividing the end portion of the blank from the intermediate portion thereof. Notches 34 and 36 reduce the width of the corresponding flange, and the reduction in width facilitates bending the end portions relative to the intermediate portion and in the direction toward the open side of the channel. Preferably, flange 22 is trimmed at this time between notch 34 and the terminal end of the end portion to provide a rear edge 38 for the flange.

Extrusion of the strip, cutting of the extruded strip into bumper blanks and the notching and trimming of the blanks as described above can all be achieved at the location where the bumper blank is to be formed into a bumper. It is readily obvious, however, that one or more of these steps can be achieved at a remote location and the blanks delivered to the location where forming of the bumper is to take place.

The essential operations to be performed in accordance with the present invention to produce a dimensionally stable basic bumper product are diagrammatically illustrated in FIG. 2 by the blocks lettered D, E, F and G. The sequence of operations D–G produce a basic bumper product which conforms with the prescribed bumper pattern and which has the desired dimensional stability with respect thereto as described above with regard to FIG. 1. Steps D–G are performed in sequence and as outlined below.

Figure 5:
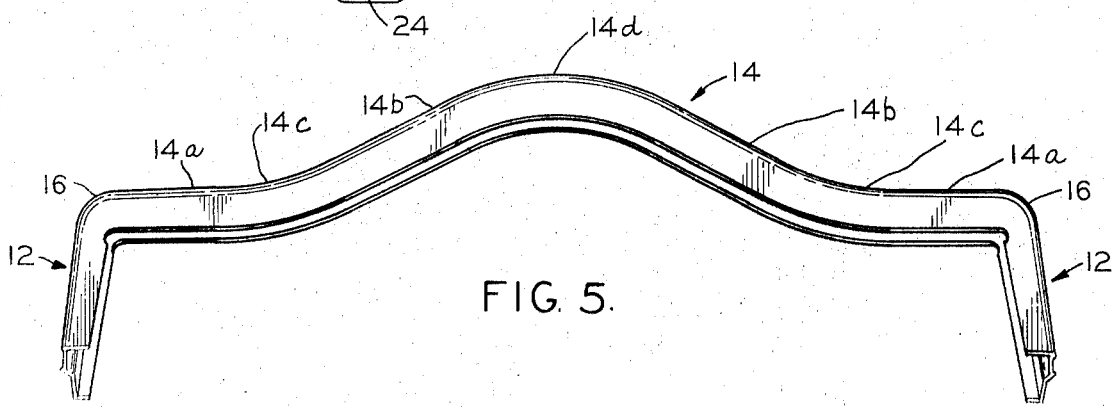
FIG. 5 is a perspective view of the hot worked bumper blank.

The notched and trimmed aluminum alloy blank is first heated, such as in a furnace, to a temperature in the solution heat treating temperature range for the alloy. It will be appreciated, however, that if extrusion of the blank material takes place at the location of the forming apparatus, the hot cut blank can be transferred directly to the forming apparatus, whereby heating of the blank from room temperature is not required. In either case, the hot blank is transferred to suitable press operated die forming apparatus which is actuated to hot work the straight blank to a preliminary bumper contour as illustrated in FIG. 5. In producing the preliminary bumper contour, the end portions of the hot blank are simultaneously bent relative to the intermediate portion of the blank and in the direction of the open side of the channel to simultaneously form bumper ends 12 and intermediate portion 14. The preliminary bumper contour thus formed approaches that of the desired basic contour. In this respect, end portions 12 extend rearwardly of intermediate portion 14 and the intermediate portion and end portions are integrally joined along the front face of the bumper at corners 16 having a predetermined preliminary radius of curvature. Further, bends 14c between intermediate portions 14a and 14b and ridge 14d between portions 14b also have predetermined preliminary radii of curvature. It is desirable to spray or otherwise coat the hot forming die surfaces to prevent die seizure of the hot formed blank. Any suitable lubricant can be used for this purpose, a water soluble lubricant being preferred in that the water dries off the die surfaces without leaving a residue.

It will be appreciated that the hot working operation subjects the blank and the die forming apparatus to considerable stress which can result in errors in the formed preliminary bumper configuration with respect to the dimensions and dimensional relationships intended to be imparted to the blank by the die forming components. Such errors may include, for example, distortion of one or the other or both of the end portions relative to the intermediate portion of the bumper which would preclude the desired coplanar relationship of the top flanges of the two end portions. An error of this nature, if not eliminated, would appear in the final bumper product and would not be eliminated by any minor finishing operations later performed on the blank to achieve the final bumper contour. Heretofore, a second hot working operation has been employed in an effort to overcome such errors. However, an error of the foregoing character can occur as a result of the quenching operation which follows hot working, or such errors resulting from hot working and quenching can be cumulative in effect. It will be appreciated therefore that any such error or errors become permanent following quenching of the hot formed blank, and a second hot working of the blank to provide the basic bumper contour prior to quenching does not avoid the possibility of such errors.

Figure 6:
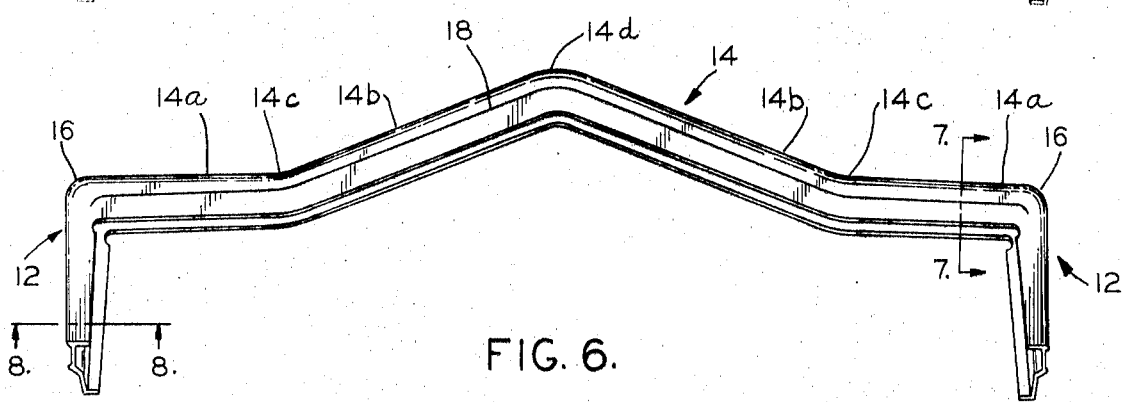
FIG. 6 is a perspective view of the cold worked bumper blank.

In accordance with the present invention, the possibility of such dimensional errors appearing in the basic bumper product is minimized by following the hot working operation with the sequence of steps indicated by blocks F and G in FIG. 2. More particularly, following the hot working operation of step E, the preliminary formed hot bumper blank is removed from the die forming apparatus and quickly quenched to a temperature at which the temper of the alloy of the blank is in an unstable condition. Quenching can be achieved by air flow, water spray, air and water spray, immersion in water, or a combination thereof. While the temper of the alloy of the blank is in the unstable condition, the blank is cold worked in suitable press actuated die apparatus from the preliminary bumper contour to the basic contour in which the bumper dimensionally conforms to the prescribed pattern therefor. This basic bumper configuration is illustrated in FIG. 6.

In the bumper embodiment illustrated, the cold working plastically deforms the metal of the blank to change the radii of curvature of corners 16, bends 14c and ridge 14d from the preliminary radii of curvature to the required radii of curvature for the basic bumper to conform with the prescribed pattern. The cold working further assures that the longitudinal dimension between corners 16 is the desired dimension and that any variation in longitudinal shrinkage from expected shrinkage is compensated for. The cold working operation further includes working the metal of the blank to provide top flange 22 of intermediate portion 14 with eyebrow or offset 18 which extends between corners 16 of the bumper, as illustrated in FIGS. 6 and 7. Offset 18 follows the longitudinal contour of intermediate portion 14 of the bumper and the ends of the offset blend into the top flange as the offset approaches corners 16. Further, as illustrated in FIG. 8, cold working includes twisting end portions 12 of the bumper relative to intermediate portion 14 so that the outer surface of the end portions inclines downwardly and inwardly at an angle X with respect to a vertical reference line O.

Each of the cold working operations described involves plastic deformation of the metal of the bumper blank to achieve a change in contour or in the dimensions or dimensional relationships between portions of the hot formed blank. Cold working the blank to the basic bumper configuration also provides for eliminating dimensional errors which may have occurred in the preliminary bumper during the hot working and/or quenching operations. Accordingly, the basic bumper product, as a result of the cold working, conforms to the prescribed design parameters and is dimensionally stable. This assures the desired physical and aesthetic mating relationship between the bumper and the vehicle on which it is to be mounted. Subsequent finishing operations on the basic bumper to achieve a final bumper product do not affect the dimensional stability thus achieved, and no further metalworking operations are performed on the basic bumper which would alter or modify the prescribed dimensions and dimensional relationships which become permanent as a result of the cold working. The cold working to achieve the basic bumper contour illustrated in FIGS. 6–8 may take place in a single press actuated die apparatus assembly, or may be achieved in sequential operations while the temper of the alloy of the blank is such that the yield strength of the alloy does not inhibit cold working.

As indicated by the block lettered H in FIG. 2, the cold worked blank is trimmed, pierced and shaped to provide a final bumper product. These operations can take place in any desired sequence and include, for example, piercing bolt holes and the like in the bumper for mounting the bumper on a vehicle or for the attachment of a license plate or license plate holder to the bumper. The finishing operations further include trimming the top and bottom flanges of end portions 12, and inwardly cupping the terminal ends of end portions 12, as illustrated in FIg. 9 of the drawing. More particularly, the inner edge of the bottom flange of end portions 12 following the cold forming operations described is indicated in FIG. 9 by broken line 50. The bottom flange is trimmed such as by suitable press actuated cutting dies to remove the excess flange material whereby the top and bottom flanges have a desired contoured inner edge, such as edge 54 of the top flange. When so trimmed, the terminal ends of end portions 12 have a contour in plan view defined by flange edge 54 and a similar edge on the lower flange and by the material of the blank in the area indicated by broken line 56.

The terminal ends of end portions 12 are then shaped or cupped by suitable die shaping apparatus to provide the desired contour as indicated by line 58. It will be appreciated, that the latter shaping will result in displacement of material of the blank inwardly relative to flange edge 54 and the corresponding lower flange edge and that such excess mterial will be trimmed from the blank during or following the shaping operation. It will be readily apparent, as mentioned hereinabove, that the cupping operation does not affect the dimensional stability achieved by the aforementioned cold working operation. The cupping merely involves bending of the material at the terminal ends of the end portions to finish the appearance of the ends.

After the blank has been pierced, trimmed, shaped and/or otherwise finished to the final design contour, it is aged as indicated by the block lettered I in FIG. 2 to provide the desired final temper for the alloy. The conditions under which the bumper is aged will, of course, depend on the alloy and the temper desired.

Following the ageing process, the bumper is in a condition for use. However, as indicated by the blocks lettered J–L in FIG. 2, it is preferred to further finish the bumper to improve the appearance of the outer surface thereof. In this respect, the bumper is preferably smoothed, such as by polishing and/or buffing the outer surface thereof completely or in selected areas. Thereafter the bumper is chemically brightened in any suitable chemical brightening solution such as, for example, a solution containing about 81 percent phosphoric acid, 3 percent nitric acid, and the remainder water, and which solution is maintained at a temperature of about 200°F during the brightening operations. Finally, the bumper is anodized in a suitable anodizing solution to produce an aluminum oxide film of desired thickness on the outer surface of the bumper. Such an oxide film may, for example, be from 0.0003 to 0.0005 inch in thickness.

Any aluminum alloy can be used to produce the bumper which will provide the required strength to meet standards for load and impact capacity for the bumper. A preferred alloy is an aluminum base alloy type X7016 having a registered composition as follows: silicon 0.10 percent (max.), iron 0.10 percent (max.), copper 0.6 to 1.4 percent manganese 0.03 percent (max.), magnesium 0.8 to 1.4 percent, zinc 4.0 to 5.0 percent, titanium 0.03 percent (max.), other (including chromium, nickle and zirconium) not exceeding 0.03 percent each and 0.10 percent total, balance aluminum. This alloy is a heat treatable, age hardenable alloy for making wrought articles and is particularly adapted for making automotive vehicle bumpers. The alloy is adapted for extruding, solution treatment, hot working, quenching, cold working, ageing and anodizing to achieve a bright surface appearance in an articifically aged temper. An automotive vehicle bumper made from a blank of this alloy having a grain structure controlled to provide a fine recrystalized structure, exhibits excellent resistance to stress corrosion cracking.

With regard to producing a vehicle bumper in accordance with the present invention using an extruded blank of the foregoing aluminum base alloy, an extruded and cut blank of the alloy is stored at room temperature prior to the bumper forming operation. To enhance anodizing results and to achieve freedom from grain growth, the extruded alloy is not cold worked following extruding, not even for stretch straightening purposes. The extruded blank is formed into a vehicle bumper in accordance with the method described herein by first solution heat treating the blank in a suitable furnace at a metal temperature of about 880°F to 980°F (typically at about 900°F to 930°F for X7016 alloy) and soaking the blank in the furnace for a period of about 5 to 15 minutes. The hot blank is then air fan cooled to a temperature range of about 700°F to 950°F (typically about 775°F to 825°F for X7016 alloy) and transferred to press actuated forming die apparatus. While in the latter temperature range the blank is hot worked to a preliminary bumper configuration.

The preliminary bumper is then quenched as quickly as possible, preferably by immersion in water, substantially to room temperature to achieve essentially a T1 temper in which the alloy has a yield strength less than 12,000 p.s.i. and preferably less than 10,000 p.s.i. Before any appreciable natural age hardening occurs, the preliminary bumper is cold worked in press actuated die forming apparatus to the basic bumper contour. Cold working can be delayed, but it will be appreciated that the delay is accompanied by an increase in yield strength, whereby larger press equipment may be required to achieve metalworking.

Minor finishing operations including flange trimming, hole piercing and cupping of the terminal ends of the end portions of the bumper are then performed and, thereafter, the bumper is artificially aged in a furnace. Ageing in two steps is performed, the first being for a minimum of 3 hours at about 175°F to 225°F, preferably about 6 hours at 205°F to 215°F, and the second being for a minimum of 3 hours at about 275°F to 325°F, preferably about 6 hours at 305°F to 315°F. This provides a slightly underaged temper and a minimum yield strength of 42 Ksi for the registered alloy.

Figure 3:
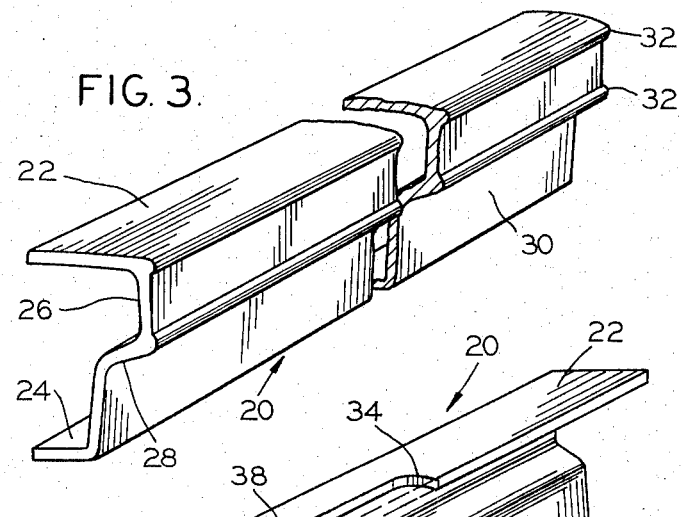
FIG. 3 is a perspective view of an extruded bumper blank.

With respect to the specific bumper illustrated herein and made from a blank of the X7106 alloy as outlined above, the bumper blank has an extruded cross-sectional contour substantially as shown in FIG. 3, and the following dimensions as extruded. The top flange is approximately 3 inches wide and three-eighths inch thick, the bottom flange approximately 1⅝ inches wide and one-fourth inch thick, the upper portion of the web about 2 inches wide vertically and one-fourth inch thick, and the lower portion of the web about 2 inches wide vertically and about three-sixteenths inch thick. The connecting portion of the web is about 1 inch wide in the direction of incline and about one-fourth inch thick.

In the hot working operation, the end portions of the bumper blank are formed relative to the intermediate portion for the corners 16 therebetween to have a preliminary radius of curvature of about 2½ inches and for the end portions to extend at an angle of about 98° with respect to the adjacent end of the intermediate portion as measured on the open side of the channel. Ridge 14d and bends 14c are each formed to have a preliminary radius of curvature of about 18 inches. The longitudinal dimensions between corners 16 is greater than the prescribed dimensions to allow for shrinkage when the hot blank is quenched.

In the cold working operation the metal is worked to provide the prescribed longitudinal dimensions and to form a radius of curvature of about 1½ inches for corners 16 of the bumper and about 6 inches for central ridge 14d and bends 14c. Further, the angularity of end portions 12 with respect to the adjacent ends of the intermediate portion is changed to about 90°. The cold working further provides for the metal in the top flange of the intermediate portion of the bumper to be worked to provide an offset or eyebrow of about one-fourth inch in the upper surface of the flange and extending between the corners of the bumper. Still further, the cold working operation provides for each of the end portions of the bumper to be twisted about 20° relative to a corresponding vertical reference plane. All of the cold working operations take place in press actuated die forming apparatus in which the mating die components have die surfaces coextensive with the bumper between the trimmed ends thereof. The basic bumper configuration produced conforms acceptably with the prescribed pattern therefor.

From the foregoing description, it will be seen that an improved method of forming a basic bumper configuration from a blank of a heat treatable, age hardenable aluminum alloy is achieved by bringing the blanks to a solution treatment temperature then, without further heating, hot working the blank to a preliminary bumper contour, quenching the hot worked blank, cold working the quenched blank to the desired basic bumper contour, and ageing the formed bumper to achieve a desired temper. Further, it will be appreciated that the steps disclosed as preliminary to solution treatment of the blank, and the final finishing operations including both those performed prior to and subsequent to ageing as described herein are not essential to practicing the present invention. Many possible changes may be made in the steps and/or the specific sequence of steps set forth herein prior to hot working and subsequent to the obtaining of dimensional stability by cold working and without departing from the principles of the present invention. Accordingly, it is to be distinctly understood that the descriptive matter pertaining to these preliminary and subsequent steps is to be interpreted merely as being illustrative and not as a limitation with respect to the present invention.

What is claimed is:

1. A method of producing an automotive vehicle bumper from an extruded blank of a heat treatable, age hardenable aluminum alloy, said blank being of a length suitable for producing the bumper, comprising:

a. solution heat treating and hot working the blank to a preliminary bumper contour by the steps of:
   1. heating the blank to a solution heat treating temperature for the alloy,
   2. working the blank while hot to form the preliminary contour, and
   3. quenching the hot worked blank to a temperature at which the temper of the alloy is unstable, b. cold working the blank while the temper of the alloy is unstable from the preliminary contour to a second bumper contour which conforms to and is dimensionally stable with respect to prescribed dimensional parameters for the bumper, and
   c. ageing said dimensionally stable blank.

2. The method according to claim 1, and shaping portions of the dimensionally stable blank to produce a final bumper contour prior to said ageing.

3. The method according to claim 1, and chemically brightening and anodizing said aged blank.

4. The method according to claim 3, and buffing said aged blank prior to chemical brightening.

5. The method according to claim 1, wherein the aluminum alloy of said blank includes zinc as the major alloying ingredient and said blank is heated to a temperature of from about 880°F to 980°F and is worked to form said preliminary contour at a temperature of from about 700°F to 950°F.

6. The method according to claim 5, wherein said quenching is effective to achieve a yeild strength for the alloy of less than about 12,000 p.s.i.

7. The method according to claim 1, wherein the aluminum alloy of said blank includes zinc as the major alloying ingredient and said ageing includes the steps of maintaining said blank at a temperature of about 175°F to 225°F for a minimum of 3 hours, elevating the temperature of the blank to about 275°F to 325°F, and maintaining the blank at said elevated temperature for a minimum of three hours.

8. The method according to claim 7, wherein said ageing includes first maintaining said blank at a temperature of about 205°F to 215°F for about 6 hours and then maintaining the blank at a temperature of about 305°F to 315°F for about 6 hours.

9. The method according to claim 1, wherein said cold working includes modifying the cross-sectional contour of said blank along a major portion of the length thereof.

10. The method according to claim 1, and performing trimming and piercing operations on said blank subsequent to said cold working and prior to said ageing.

11. A method of producing an automotive vehicle bumper from an extruded blank of a heat treatable, age hardenable aluminum alloy, comprising the steps of forming the blank to a basic bumper contour dimensionally conforming to a prescribed pattern and in which contour predetermined dimensions of the bumper are stabilized with respect to the pattern, and then ageing said blank, said forming including:

a. heating said blank to a solution heat treating temperature for the alloy,
   b. working the heated blank while at a hot working temperature to form a first bumper contour,
   c. quick quenching the blank while in said first contor to a temperature at which the temper of the alloy is unstable, and
   d. cold working the quenched blank while the temper of the alloy is unstable to form said basic bumper contour.

12. The method according to claim 11, wherein said blank is channel shaped in cross section and said aluminum alloy includes zinc as the major alloying ingredient.

13. The method according to claim 12, wherein said blank is heated to a temperature of from about 880°F to 980°F and is worked to form said first contour at a temperature of from about 700°F to 950°F.

14. The method according to claim 13, wherein said quenching is to a temperature effective to achieve a yield strength for the alloy of less than about 12,000 p.s.i.

15. The method according to claim 14, wherein said quenching is by immersion in water.

16. The method according to claim 12, wherein said cold working of said quenched blank to form said basic bumper contour includes modifying the cross-sectional contour of the blank along a major portion of the length thereof.

17. The method according to claim 12, and shaping the terminal ends of the basic bumper by bending in the direction of the open side of the channel of said blank.

18. The method according to claim 17, and performing trimming and piercing operations on said basic bumper.

19. The method according to claim 12, wherein said ageing includes the steps of maintaining said blank at a temperature of about 175°F to 225°F for a minimum of 3 hours, elevating the temperature of the blank to about 275°F to 325°F, and maintaining the blank at said elevated temperature for a minimum of three hours.

20. The method according to claim 19, wherein said ageing includes first maintaining said blank at a temperature of about 205°F to 215°F for about 6 hours and then maintaining the blank at a temperature of about 305°F to 315°F for about 6 hours.

21. The method according to claim 19, and buffing, chemically brightening and anodizing said aged blank.

* * * * *